US 6,653,361 B2

(12) United States Patent
Gilman et al.

(10) Patent No.: US 6,653,361 B2
(45) Date of Patent: Nov. 25, 2003

(54) FLAME RETARDANT POLYURETHANE COMPOSITION AND METHOD OF MANUFACTURE THEREOF

(75) Inventors: Amy L. Gilman, Danielson, CT (US); Scott S. Simpson, Woodstock, CT (US); Petr Svoboda, Danielson, CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 10/132,667

(22) Filed: Apr. 25, 2002

(65) Prior Publication Data

US 2003/0040548 A1 Feb. 27, 2003

Related U.S. Application Data

(63) Continuation-in-part of application No. 10/033,541, filed on Dec. 26, 2001.
(60) Provisional application No. 60/259,273, filed on Dec. 29, 2000.

(51) Int. Cl.$^7$ ................................................ C08G 18/28
(52) U.S. Cl. ...................... 521/171; 521/110; 521/112; 521/117; 521/119; 521/122; 521/123; 521/126; 521/127; 521/128; 521/129; 521/131; 521/159; 521/170; 521/174
(58) Field of Search ................................ 521/110, 112, 521/117, 119, 122, 123, 126, 127, 128, 129, 131, 159, 171, 176, 174

(56) References Cited

U.S. PATENT DOCUMENTS

| 2,602,783 | A | 7/1952 | Simon et al. |
| 2,621,166 | A | 12/1952 | Schmidt et al. |
| 2,698,838 | A | 1/1955 | Simon et al. |
| 2,808,391 | A | 10/1957 | Pattison |
| 2,811,493 | A | 10/1957 | Simon et al. |
| 2,834,748 | A | 5/1958 | Bailey et al. |
| 2,846,458 | A | 8/1958 | Haluska |
| 2,866,762 | A | 12/1958 | Brochhagen et al. |
| 2,866,774 | A | 12/1958 | Price |
| 2,868,824 | A | 1/1959 | Haluska |
| 2,870,097 | A | 1/1959 | Pattison |
| 2,878,601 | A | 3/1959 | Burmeister et al. |
| 2,902,473 | A | 9/1959 | Smith |
| 2,911,390 | A | 11/1959 | Smith |
| 2,917,480 | A | 12/1959 | Bailey et al. |
| 2,921,915 | A | 1/1960 | Brochhagen et al. |
| 2,962,524 | A | 11/1960 | Hostettler et al. |
| 3,021,309 | A | 2/1962 | Cox et al. |
| 3,021,310 | A | 2/1962 | Cox et al. |
| 3,021,311 | A | 2/1962 | Cox et al. |
| 3,021,312 | A | 2/1962 | Cox et al. |
| 3,021,313 | A | 2/1962 | Cox et al. |
| 3,021,314 | A | 2/1962 | Cox et al. |
| 3,021,315 | A | 2/1962 | Cox et al. |
| 3,021,316 | A | 2/1962 | Cox et al. |
| 3,021,317 | A | 2/1962 | Cox et al. |
| 3,057,901 | A | 10/1962 | Plucddcmann |
| 3,169,945 | A | 2/1965 | Hostettler et al. |
| 3,383,351 | A | 5/1968 | Stamberger |
| 4,022,718 | A | * 5/1977 | Russo ........................ 521/160 |
| 4,147,847 | A | 4/1979 | Schweiger .................. 521/112 |
| 4,162,353 | A | 7/1979 | Papa et al. .................. 521/107 |
| 4,218,543 | A | 8/1980 | Weber et al. .................. 521/51 |
| 4,269,945 | A | 5/1981 | Vanderhider et al. |
| 4,297,444 | A | 10/1981 | Gilbert et al. ............... 521/160 |
| 4,444,910 | A | 4/1984 | Rice et al. ..................... 521/51 |
| 4,511,688 | A | 4/1985 | Termine et al. ............. 524/380 |
| 4,530,941 | A | 7/1985 | Turner et al. ................ 521/176 |
| 4,849,459 | A | 7/1989 | Grace et al. ................. 521/110 |
| 5,733,945 | A | 3/1998 | Simpson ...................... 521/124 |
| 6,084,001 | A | * 7/2000 | Foreman et al. ............. 521/163 |
| 6,191,179 | B1 | * 2/2001 | Scherzer et al. ............. 521/114 |

FOREIGN PATENT DOCUMENTS

| GB | 733624 | 7/1955 |
| GB | 1 020 310 A | 2/1966 |
| WO | WO 99 31173 A | 6/1999 |

OTHER PUBLICATIONS

"Flame Retardants"; Dead Sea Bromine Group, available as of Dec. 26, 2001.
International Search Report, mailed Nov. 15, 2002.

* cited by examiner

*Primary Examiner*—John M. Cooney, Jr.
(74) *Attorney, Agent, or Firm*—Cantor Colburn LLP

(57) ABSTRACT

A polyurethane foam or elastomer comprises an organic polyisocyanate component, an active hydrogen-containing component reactive with the polyisocyanate component, wherein the viscosity of this component is less than about 500 cP at room temperature, a catalyst component, a surfactant, and a flame retarding composition. The components may be low VOC. A preferred flame retarding composition comprises an antimony-based compound, a halogenated, active hydrogen-containing component reactive with the polyisocyanate component, and a halogenated flame-retarding agent. Such polyurethanes are useful as gaskets, seals, padding, in automotive applications, and the like.

17 Claims, No Drawings

FLAME RETARDANT POLYURETHANE COMPOSITION AND METHOD OF MANUFACTURE THEREOF

CROSS-REFERENCE TO RELATED APPLICATIONS

This application is a continuation-in-part of U.S. patent application Ser. No. 10/033,541 filed on Dec. 26, 2001, which claims priority to U.S. Serial No. 60/259,273, filed Dec. 29, 2000, the entire contents of which are incorporated herein by reference.

BACKGROUND

1. Field of the Invention

This invention relates generally to flexible polyurethanes. More particularly, this invention relates to highly filled, flexible polyurethane foams.

2. Brief Description of the Prior Art

High-density polyurethane foams and solid polyurethanes are useful materials for a wide variety of applications, particularly sealing gaskets for electronic devices. These foams preferably have densities in the range from about 10 to about 65 pounds per cubic foot (pcf). It is also important that the foams have acceptable compression set, compressive force deflection, tensile strength, elongation, tear strength, low outgassing, and non-corrosiveness.

While a number of prior art foams meet the above requirements, such as the PORON® foams sold by Rogers Corp., Rogers, Conn., it has heretofore been difficult to impart good or excellent flame resistance to such foams. For example, many commercial products must presently meet standards of flame resistance as measured by the test procedure set forth in Underwriters Laboratories, Inc.® Bulletin UL-94, Test for Flammability of Plastic Materials for Parts in Devices and Appliances, Fifth Edition from Oct. 29, 1996, incorporated herein by reference in its entirety. Of particular interest are "20 mm Vertical Burning Test; V-0, V-1, or V-2" and "Horizontal Burning Foamed Material Test; HBF, HF-1, or HF-2". A rating of UL 94 V-0 or HF-1 is often specified for foams that are used in components located close to power sources.

The preparation of low density, flexible polyurethane flame-retardant foam compositions are generally well known as evidenced by the prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retarded, polyurethane foams by employing specific foam stabilizers, which reduce the required amount of normal flame-retardant additives. U.S. Pat. No. 4,162,353 teaches the preparation of flexible polyurethane foams incorporating therein a halo-substituted alkyl phosphate such as tris(2-chloroethyl)-phosphate and an unsubstituted trialkylphosphate such as triethylphosphate. U.S. Pat. No. 4,849,459 describes a flame retardant flexible polyurethane foam comprising the reaction product of a polyether polyol and a toluene diisocyanate and incorporating melamine and another flame retardant. All of the foregoing are incorporated herein by reference.

While suitable for their intended purposes, the above-described flexible polyurethane foams are low density, have lower tensile strength, lower tear strength, lower compressive force deflection, and poor compression set resistance. Because of these deficiencies, these low-density prior art foams are not suitable for use as gaskets. Consequently, there is a need for a high-density polyurethane foam composition, which is highly flame retardant, and yet which still retains the required degree of compression set, compressive force deflection, tensile elongation, tear strength, low outgassing, and non-corrosiveness.

SUMMARY

The above-discussed and other drawbacks and deficiencies of the prior art are overcome or alleviated by a composition for the formation of a flame retardant polyurethane foam comprising an organic polyisocyanate component, an active hydrogen-containing component reactive with the polyisocyanate component, wherein the active hydrogen-containing component preferably has an overall viscosity of less than about 500 centipoise, a catalyst component, a surfactant, and a flame retarding composition comprising an antimony-based compound, a halogenated, active hydrogen-containing component reactive with the polyisocyanate component, and a halogenated flame-retarding agent, preferably wherein the composition, without the polyisocyanate component, has a viscosity of less than about 8,000 centipoise prior to foaming. Preferred antimony-based compounds include antimony trioxide, preferred halogenated, active hydrogen-containing components include liquid brominated diols, and preferred halogenated flame-retarding agents are solid, bromine-containing organic compounds.

The components may be low VOC in order to provide low fogging and low outgassing. Accordingly, in another embodiment, a composition for the formation of a flame retardant, low outgassing, low fogging polyurethane foam comprises a low VOC organic polyisocyanate component, a low VOC active hydrogen-containing component reactive with the polyisocyanate component, wherein the active hydrogen-containing component preferably has an overall viscosity of less than about 500 centipoises, a catalyst component, a surfactant, and a flame retarding composition comprising a halogenated, active hydrogen-containing component reactive with the polyisocyanate component, preferably wherein the composition, without the polyisocyanate component, has a viscosity of less than about 8,000 centipoises prior to foaming.

Such foams have a UL-94 rating of V-1 and/or HBF. Even more preferably, foams having a thickness of about 31 to about 250 mils and a density of about 15 to about 30 pcf have a UL 94 V-0 rating, and foams having a thickness of about 28 to about 40 mils and a density of about 15 to about 30 pcf have a UL 94 V-0 rating. The foams have excellent physical properties, low outgassing (preferably less than 1% by weight), and non-corrosivess.

Because of the foregoing features and advantages, the materials described herein are especially suitable where flame retardant cushioning is desired, for example as gaskets for electronic and automotive applications. The above discussed and other features and advantages will be appreciated and understood by those skilled in the art from the following detailed description.

DETAILED DESCRIPTION OF THE PREFERRED EMBODIMENTS

A composition particularly suitable for the formation of polyurethane foams having incorporated therein a flame retardant composition comprises an organic polyisocyanate component, an active hydrogen-containing component substantially reactive with the low functionality isocyanate to form a polyurethane, wherein the active hydrogen-containing component has a viscosity of less than about 500 centipoise;

a surfactant for structurally stabilizing the froth produced according to the procedure below, during the period that the liquid phase of said froth is chemically stable, and until said froth is cured;

a catalyst having substantial catalytic activity in the curing of said mixture; and a flame retarding composition comprising a halogenated, active hydrogen-containing component reactive with the polyisocyanate component.

Preferably, the viscosity of the total composition without the inclusion of the polyisocyanate component has a viscosity of less than about 8,000 centipoises prior to foaming. The process of forming the foam comprises forming the above-described composition; substantially uniformly dispersing inert gas throughout the mixture by mechanical beating of the mixture to form a heat curable froth which is substantially structurally and chemically stable, but workable at ambient conditions; and curing said froth to form a cured foam.

The organic polyisocyanate components preferably are those having the general formula:

$$Q(NCO)_i$$

wherein i is an integer of two or more and Q is an organic radical having the valence of i. In one embodiment, the average value of i is low, i.e., in the range from 2.0 to about 2.6, and preferably in the range from 2.0 to about 2.2. Use of polyisocyanates having a low functionality (in conjunction with the polyol component described below) unexpectedly results in improved toughness for the cured polyurethane foams.

Q can be a substituted or unsubstituted hydrocarbon group (i.e., an alkylene or an arylene group). Q can be a group having the formula $Q^1$—Z—$Q^1$ wherein $Q^1$ is an alkylene or arylene group and Z is —O—, —O—$Q^1$—, —CO—, —S—, —S—$Q^1$—S—, —SO—, or —$SO_2$—. Examples of such compounds include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, and isopropylbenzene-alpha-4-diisocyanate.

Q can also represent a polyurethane radical having a valence of i in which case $Q(NCO)_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of from about 30 percent to about 200 percent stoichiometric excess, the stoichiometry being based upon equivalents of isocyanate group per equivalent of hydroxyl in the polyol.

Further included among useful polyisocyanates are dimers and trimers of isocyanates and diisocyanates and polymeric diisocyanates such as those having the general formula:

$$[Q^2(NCO)_i]_j$$

in which i is an integer of one or more, j is an integer of two or more, and $Q^2$ is a polyfunctional organic radical. An example is polymethylene polyphenyl isocyanate. $Q^2$ may also be a compound of the general formula:

$$L(NCO)_i$$

in which i is one or more and L is a monofunctional or polyfunctional atom or radical. Examples of this type include ethylphosphonic diisocyanate, $C_2H_5P(O)(NCO)_2$, phenylphosphonic diisocyanate, $C_6H_5P(O)(NCO)_2$, compounds containing a trivalent siliconcyanate group, isocyanates derived from sulfonamides ($QSO_2NCO$), cyanic acid, and thiocyanic acid. Combinations of all of the foregoing may also be used. In general, the aromatic polyisocyanates are preferred because of their greater reactivity.

Of course, a blend of any of the foregoing isocyanate may be used, as long as the total mole average isocyanate functionality is within the desired range. The amount of polyisocyanate employed will vary slightly depending upon the nature of the polyurethane being prepared. In general, the total —NCO equivalent to total active hydrogen equivalent should be such as to provide a ratio of 0.8 to 1.2 equivalents of —NCO per equivalent of active hydrogen, e.g., hydroxyl hydrogen, of the active hydrogen reactant, and preferably a ratio of about 1.0 to 1.05 equivalents of —NCO per active hydrogen.

The active hydrogen-containing component generally includes a mixture of polyhydroxyl-containing compounds, such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. No. 2,878,601); hydroxyl-terminated polyesters (U.S. Pat. Nos. 2,698,838, 2,921,915, 2,866,762, 2,602,783, 2,811,493, and 2,621,166); hydroxymethyl-terminated perfluoromethylenes (U.S. Pat. Nos. 2,911,390 and 2,902,473); polyalkylene ether glycols (U.S. Pat. No. 2,808,391; British Pat. No. 733,624); polyalkylene ether glycols (U.S. Pat. No. 2,808,391; British Pat. No. 733,624); polyalkylenearylene ether glycols (U.S. Pat. No. 2,808,391); and polyalkylene ether triols (U.S. Pat. No. 2,866,774).

Especially preferred polyhydroxyl-containing materials are the polyether polyols obtained by the chemical addition of alkylene oxides, such as ethylene oxide, propylene oxide and mixtures thereof, to water or polyhydric organic compounds, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methylene-3-cyclohexene-1,1-dimethanol,3-methylene-1,5-pentanediol, diethylene glycol, (2-hydroxyethoxy)-1-propanol, 4-(2hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)methylpentanediol-1,5; 1,1,1-tris[2-hydroxyethoxy) methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, and the like. The alkylene oxides employed in producing polyoxyalkylene polyols normally have from 2 to 4 carbon atoms. Propylene oxide and mixtures or propylene oxide with ethylene oxide are preferred. The polyols listed above can be used per se as the active hydrogen compound.

A preferred class of polyether polyols is represented generally by the following formula

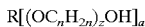

wherein R is hydrogen or a polyvalent hydrocarbon radical; a is an integer (i.e., 1 or 2 to 6 to 8) equal to the valence of R, n in each occurrence is an integer from 2 to 4 inclusive (preferably 3) and z in each occurrence is an integer having a value of from 2 to about 200, preferably from 15 to about 100.

Additional active hydrogen-containing compounds are the polymers of cyclic esters. The preparation of the cyclic ester polymers from at least one cyclic ester monomer is well documented in the patent literature as exemplified by U.S. Pat. Nos. 3,021,309 through 3,021,317; 3,169,945; and 2,962,524. Suitable cyclic ester monomers include but are not limited to delta-valerolactone; epsilon-caprolactone; zeta-enantholactone; the monoalkyl-valerolactones, e.g., the monomethyl-, monoethyl-, and monohexyl-valerolactones.

Cyclic ester/alkylene oxide copolymers can also be prepared by reacting a mixture comprising cyclic ester and alkylene oxide monomers, an interfacial agent such as a solid, relatively high molecular weight poly(vinylstearate) or lauryl methacrylate/vinyl chloride copolymer (reduced viscosity in cyclohexanone at 30° C. from about 0.3 to about 1.0), in the presence of an inert normally-liquid saturated aliphatic hydrocarbon vehicle such as heptane and phosphorus pentafluoride as the catalyst therefor, at an elevated temperature, e.g., about 80° C.

Another type of active hydrogen-containing material includes the polymer polyol compositions obtained by polymerizing ethylenically unsaturated monomers in a polyol as described in U.S. Pat. No. 3,383,351, the disclosure of which is incorporated herein by reference. Suitable monomers for producing such compositions include acrylonitrile, vinyl chloride, styrene, butadiene, vinylidene chloride and other ethylenically unsaturated monomers as identified and described in the above-mentioned U.S. patent. Suitable polyols include those listed and described hereinabove and in the U.S. patent. The polymer polyol compositions can contain from 1 to about 70 weight percent (wt %), preferably about 5 to about 50 wt %, and most preferably about 10 to about 40 wt % monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonate, perborates, and azo compounds.

Preferred active hydrogen-containing components are polyether polyols, mixtures of polyether polyols and mixtures of polyether and polyester polyols. Preferred polyether polyols include polyoxyalkylene diols and triols, and polyoxyalkylene diols and triols with polystyrene and/or polyacrylonitrile grafted onto the polymer chain, and mixtures thereof. Preferred polyester polyols are based on caprolactone. In particular, the polyol components are reformulated to yield a wide range of moduli. Chain extenders and crosslinking agents may further be included, to the extent that such chain extenders and cross-linking agents are low VOC. Exemplary chain extenders and cross-linking agents are low molecular weight diols, such as alkane diols and dialkylene glycols, and/or polyhydric alcohols, preferably triols and tetrols, having a molecular weight from about 200 to 400.

In one preferred embodiment, the polyol component comprises one or a mixture of a polyether polyol having a molecular weight in the range from about 500 to about 1500, one or a mixture of a polyether oxide diol having a molecular weight in the range from about 1000 to about 3000, and one or a mixture of a polyether diol having polystyrene and polyacrylonitrile grafts and having a molecular weight in the range from about 1500 to about 4000. This component may be used to produce a low CFD (compression force deflection) foam.

In another preferred embodiment, the polyol component comprises one or a mixture of a low molecular weight polyether oxide diol having a molecular weight in the range from about 250 to about 750; one or a mixture of a polyether oxide diol having a molecular weight in the range from about 1000 to about 3000; and one or a mixture of a polypropylene oxide diol having polystyrene and polyacrylonitrile grafts having a molecular weight in the range from about 2000 to about 3000. This polyol component is useful for the production of a high CFD foam.

In order to effectively incorporate the desired flame retarding compositions as described below, while maintaining good processing characteristics of the froths, it has been found that the viscosity of the active hydrogen-containing component (without other components) is preferably less than about 500 centipoise (cP) at room temperature, more preferably less than about 300 cP, most preferably less than about 250 cP. In particular, low viscosity polyol compositions allow high levels of flame retardant additives to be used to attain the desired properties while retaining processability and good physical properties of the resulting polyurethane foam.

The polyol or polyol mixture can have hydroxyl numbers that vary over a wide range. In general, the hydroxyl numbers of the polyols or mixtures thereof, including other cross-linking additives, if employed, can be from about 28 to about 1000, and higher, preferably from about 100 to about 800. The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives used in the invention. The hydroxyl number can also be defined by the equation:

$$OH=(56.1\times1000\times f)/M.W.$$

wherein OH is the hydroxyl number of the polyol, $f$ is the average functionality, that is average number of hydroxyl groups per molecule of polyol, and M.W. is the average molecular weight of the polyol.

The exact polyol or polyols employed depends upon the end-use of the polyurethane foam. In particular, variation in the polyol component can yield a wide range of moduli and toughness. The molecular weight and the hydroxyl number are selected properly to result in flexible foams. The polyol or polyols including cross-linking additives, if used, preferably possess a hydroxyl number of from about 45 to about 70 or more when employed in flexible foam formulations. Such limits are not intended to be restrictive, but are merely illustrative of the large number of possible combinations of the polyols that can be employed.

A wide variety of surfactants can be employed for purposes of stabilizing the froth, organosilicone surfactants being preferred. A preferred organosilicone surfactant is a copolymer consisting essentially of $SiO_2$ (silicate) units and $(CH_3)_3SiO_{0.5}$ (trimethylsiloxy) units in a molar ratio of silicate to trimethylsiloxy units of about 0.8:1 to about 2.2:1, preferably about 1:1 to about 2.0:1. Another preferred organosilicone surfactant stabilizer is a partially cross-linked siloxane-polyoxyalkylene block copolymer and mixtures thereof wherein the siloxane blocks and polyoxyalkylene blocks are linked by silicon to carbon, or by silicon to oxygen to carbon, linkages. The siloxane blocks are comprised of hydrocarbon-siloxane groups and have an average of at least two valences of silicon per block combined in said linkages. At least a portion of the polyoxyalkylene blocks are comprised of oxyalkylene groups and are polyvalent, i.e., have at least two valences of carbon and/or carbon-bonded oxygen per block combined in said linkages. Any remaining polyoxyalkylene blocks are comprised of oxyalkylene groups and are monovalent, i.e., have only one valence of carbon or carbon-bonded oxygen per block combined in said linkages. Additionally, conventional organopolysiloxane-polyoxyalkylene block copolymers such as those described in U.S. Pat. Nos. 2,834,748, 2,846,458, 2,868,824, 2,917,480, and 3,057,901 can be employed. The amount of the organosilicone polymer employed as a foam stabilizer in this invention can vary over wide limits, e.g., from about 0.5 weight parts to 10 weight parts or greater, per hundred weight parts of the active hydrogen component. Preferably, the amount of organosilicone copolymer present in the foam formulations varies from about 1.0 weight parts to about 6.0 parts on the same basis.

Catalysts include various inorganic metal compounds and metal compounds that include certain organic groups. Metal acetyl acetonates are preferred, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A common catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine) diacetyl acetylacetonato nickel, and the like. Ferric acetylacetonate is particularly preferred, due to its relative stability, good catalytic activity, and lack of toxicity. The metal acetylacetonate is most conveniently added by pre-dissolution in a suitable solvent such as dipropylene glycol or other hydroxyl containing compound which will then participate in the reaction and become part of the final product.

Added to the metal acetyl acetonate is acetyl acetone (2,4-pentanedione), as disclosed in commonly assigned U.S. Pat. No. 5,733,945 to Simpson, which is incorporated herein by reference. It has been discovered that the acetyl acetone can be used to delay or inhibit the normally reactive metal acetyl acetonate at the lower temperatures needed to achieve proper mixing and casting. In other words, the acetyl acetone provides heat latency, which allows time for the required mixing, casting, and other procedures, and avoids deleterious premature curing during low temperature processing. However, as the material is cured in the several heating zones and the temperature of the urethane mixture rises, the acetyl acetone is driven off. With the acetyl acetone removed together with its associated delaying function, the metal acetyl acetonate is allowed to resume its normally high reactivity and provide a very high level of catalysis at the end of the polyurethane reaction. This high reactivity late in the processing cycle is advantageous and provides improved physical properties such as compression set. In general, the ratio of metal acetyl acetonate to acetyl acetone is about 2:1 on a weight basis. The amount of catalyst present in the liquid phase is preferably in the range of 0.03 to 3.0 weight parts per hundred weight parts of the active hydrogen compound.

The polyurethanes are formulated to provide low fogging and outgassing. Accordingly, instead of the halogenated and/or phosphorus-based flame retardant additives commonly used in the art, which can cause fogging and outgassing, the flame retarding composition comprises an antimony-based compound, a halogenated, active hydrogen-containing component reactive with the polyisocyanate component, and a halogenated flame-retarding agent, wherein the molar ratio of halogen to antimony is about 2.0:1 to about 18.0:1. As may be seen by reference to the related art discussed above, it was thought that high levels of flame resistance could be imparted to polyurethane foams only by use of halogenated and phosphorus-based flame retarding agents. Such agents contribute to fogging and outgassing problems. The inventors hereof have unexpectedly discovered that tough, highly flame resistant polyurethane foams with no or minimal fogging or outgassing may be achieved by the use of the above-described flame retarding composition having a specified ratio of antimony and bromine. In a particularly advantageous feature, the viscosity of the active hydrogen-containing component is selected so as to allow incorporation of the improved flame retarding composition, while at the same time maintaining advantageous physical properties in the cured urethane. Appropriate selection of viscosity also allows incorporation of other fillers and reactive or non-reactive additives. Additionally, the components of the flame retarding composition are selected to be either solid or reactive, and thus are low VOC.

In another embodiment, flame resistance and low fogging and outgassing is imparted to the cured compositions by use of a combination of low VOC components and a low VOC flame retarding composition comprising at least a low VOC halogenated, active hydrogen-containing component. The curable compositions accordingly comprise a low VOC isocyanate, a low VOC active hydrogen-containing component, a low VOC surfactant, a low VOC catalyst, and a low VOC flame retarding composition. The low VOC flame retardant composition comprises at least a low VOC, halogenated, active hydrogen-containing component, and may optionally further comprise other low VOC components. Again, the viscosity of the active hydrogen-containing component is selected so as to allow incorporation of the flame retarding composition. As used herein, "low VOC" refers to compounds having low (2% or less by weight) volatile organic compound levels. Volatile organic compounds as used herein refers to compounds capable of being driven off as a vapor at room temperature or slightly elevated temperatures, e.g., up to about 125° C.

Preferred antimony-based compounds for use in the flame retarding compositions include antimony trioxide, which is a solid.

Preferred reactive, halogenated, active hydrogen-containing components are similar to those described above for the formation of the polyurethane, except that a halogen, preferably bromine, is present. Especially preferred reactive components include brominated diols that are liquid at the reactive temperature, for example 25° C., such as tetrabromophthalate diol. Solid, brominated diols that dissolve in the reactive composition are also suitable, for example, dibromoneopentyl alcohol and/or tribromoneopentyl alcohol. Use of a liquid, halogenated component allows greater incorporation of other solid, flame retarding agents while maintaining the overall viscosity within acceptable limits, and providing cured polyurethanes having good physical properties such as tensile strength, compression set resistance, and the like.

Preferred halogenated flame-retarding agents that are not reactive are generally the solid, bromine-containing organic compounds known for use in polyurethanes. Such agents include, but are not limited to, hexabromocyclododecane, brominated indan, ethylenebistetrabromophthalimide, bis (tribromophenoxy) ethane, tris(tribromophenyl) cyanurate, decabromodiphenyl oxide, tetradecabromodiphenoxybenzene, ethane-1,2-bis (pentabromophenyl), and brominated polystyrene.

Other flame retarding fillers may be used, for example aluminum trihydrate and melamine cyanurate. Particularly advantageous flame retardant fillers are those with high surface area such as carbon blacks and nanoclays. Nanoclays have the additional advantage of high aspect ratio but may require special treatment to separate the nanolayers to achieve the desired high surface area (exfoliation). An exemplary nanoclay is natural montmorillonite, produced, for example, by Southern Clay using various organic modifiers, under the trade names CLOISITE 10A, 15A, 20A, 25A, 30B, and 93A. In order to get exfoliation of layers, CLOISITE 30B is preferred. Exfoliation of CLOISITE 20A was performed in PHT4-DIOL at elevated temperature (100° C.).

The flame retarding composition is present in an effective amount, which is readily determined by one of ordinary skill in the art based on the degree of flame resistance, processability of the formulation, and desired polyurethane properties. Effective quantities will generally be about 20 to about 60 weight percent of the non-isocyanate containing mixture. The relative amount of antimony (when present) and total bromine is adjusted to provide a molar ratio of total bromine to antimony of greater than or equal to about 2.0:1, preferably greater than or equal to about 2.5:1, more preferably greater than or equal to about 3.0:1 and most preferably greater than or equal to about 4.0:1. It is generally preferable to have the relative amount of antimony (when present) and total bromine adjusted to provide a molar ratio of total bromine to antimony of less than or equal to about 24.0:1, less than or equal to about 18.0:1, less than or equal to about 16.0:1, or less than or equal to about 14.0:1. It has been unexpectedly discovered that molar ratios of about 10.0:1 and higher can be used to proved excellent flame retardance in combination with desirable properties. A molar ratio of total bromine to antimony of 2.0:1 is approximately equivalent to a weight ratio of 1.25:1, while a molar ratio of 18.0:1 is approximately equal to a weight ratio of about 9.3:1.

In addition, the weight percent of bromine (based on the total composition) is selected so as to provide a desired level of flame resistance, preferably at least HBF, more preferably at least V-1 as measured in accordance with UL-94. In general, bromine comprises at least about 12, preferably at least about 14 weight percent of the total composition. A lower concentration of bromine may be used where other flame retardant additives are present, such as melamine cyanurate. Of course, higher levels of bromine and antimony containing components, other additives, or combinations thereof can also be used to obtain improved flame resistance as long as the total viscosity is within processable limits.

Other, optional additives may be added to the polyurethane froth mixture in the manufacturing process. For example, conventionally used additives such as other fillers (silica, talc, calcium carbonate, clay, and the like), dyes, pigments (for example titanium dioxide and iron oxide), and the like can be used.

In a further unexpected feature, appropriate selection of anti-oxidant also results in improved high temperature resistance together with low fogging and outgassing. BHT, for example, is a commonly used antioxidant, which is a solid at room temperature, but which sublimes at slightly elevated temperatures. When replaced with phenolic and amine-based antioxidants, such at those available under the trade names IRGANOX 1135, CAS No. 125643-61-0, and IRGA-NOX 5057, CAS No. 68411-46-1, available from Ciba Specialty Chemicals, high temperature resistance is improved while decreasing fogging and outgassing. Effective quantities are of from about 0.05 to about 0.25 weight percent of IRGANOX 1135 antioxidant and from about 0.005 to about 0.07 weight percent of IRGANOX 5057, preferably from about 0.07 to about 0.10 weight percent of IRGANOX 1135 and preferably from about 0.015 to about 0.03 weight percent of the polyol component. Use of hindered amine light stabilizers further imparts UV resistance.

Small amounts of an auxiliary blowing agent can be employed. For example, high boiling fluorocarbons, e.g., boiling above about 40° C. can be used. Specific fluorocarbons include for example 1,1,2-trichloro-1,2,2-trifluoroethane and isomers of tetrachlorodifluoroethane, tetrachloromonofluoroethane, and the like. Other auxiliary blowing agents, such as small amounts of water, although it is not necessary, can be employed for purposes of providing an added expansion during heat curing in those cases where such added expansion is desired.

The gas phase of the novel froths in most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide, and even fluorocarbons, which are normally gaseous at ambient temperatures. The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than 100 to 200 p.s.i.g. It is significant, however, to note that conventional, readily available, mixing equipment is used and no special equipment is necessary. The mechanical beating is conducted over a period of a few seconds to a minute in an Oakes mixer, or 3 to 30 minutes in a Hobart mixer, or however long it takes to obtain the desired froth density in the mixing equipment employed.

The froth as it emerges from the mechanical beating operation is substantially chemically stable and is structurally stable but easily workable at ambient temperatures, e.g., about 10° C. to about 40° C. The froth viscosity depends on the initial viscosity of the unfrothed composition. There is a range of easily processable compositions ranging from a few hundred centipoises to as high as 8,000 centipoise. The low viscosity polyol compositions used in combination with the flame retardant or other filler or additive compositions results in viscosities within this processable range.

These froths can be continuously cast into sheets or rolls, or molded into complex shapes. The density of the cured foams is generally about 10 to about 65 pcf, preferable about 15 to about 40 pcf, most preferably about 15 to about 30 pcf.

In a preferred feature, the foams formed from the above-described compositions are flame resistant, having a UL-94 rating of V-2 and/or HBF, and/or passing MVSS No. 302. Even more preferably, foams having a thickness of about 10 to about 500 mils, more preferably about 31 mils to about 250 mils and a density of about 15 to about 30 pcf have a UL 94 rating of V-1 and/or HF-2, most preferably V-0 and/or HF-1. The foams are low fogging as measured in accordance with SAE J1756, and low outgassing, as measured in accordance with ASTM E595. The foams also lose less than 1% of their weight when held at 125° C. for 24 hours.

In one embodiment, the foams are low modulus, i.e., the CFD is about 3 to about 30 at foam densities of about 10 to about 50, more preferably about 15 to about 30 pcf, and tough, as reflected by high tear strengths, high tensile strengths, and high elongations relative to the modulus. The foams have a preferred compression set of less than about 20%, and a more preferred compression set of less than about 10% (after 50% compression for 22 hours at 70° C.). The foams have a preferred compressive force deflection of less than about 85 psi, a more preferred compressive force deflection of less than about 30 psi, a preferred elongation greater than about 100, a preferred tensile strength of greater than about 50 psi, a more preferred tensile strength of greater than about 80 psi, a preferred tear strength greater than about 5, and a more preferred tear strength greater than about 8 pli.

In another embodiment, the foams are high modulus, i.e., the CFD is above about 30, preferably above about 50, more preferably above about 100, up to about 200 CFD, at a density of about 30 to about 65 pcf. The foams have a tensile strength of about 200 to about 500, an elongation greater than about 80, a tear strength greater than about 30, and a compression set of less than about 10% (after 25% compression for 22 hours at 70° C.).

In order to impart additional flame resistance to the composition, while maintaining low fogging and outgassing, the cured product may be overprinted with a UV-curable acrylic composition. Such compositions may typically be used to prevent the material from sticking to itself during manufacture. Suitable acrylic compositions include for example RCE01496R which is commercially available from Sun Chemical.

The foams produced from these compositions are useful for example in the vehicle industry, for example in the automotive, aircraft, and shipbuilding industries, and in the refrigeration and construction industries for foam filling and foam backing of cavities, for example boards and control panels, as interim layers for sandwich elements or for foam filling refrigerator and freezer casings. The polyurethane foams are also suitable as seals and gaskets, for vibration damping, and as insulation materials, for example as a gasket and seal for LED displays in electronic devices, and as wall linings, housing parts, cushion materials, armrests, headrests, device safety covers, and central consoles. The polyurethane foams are further described by the following non-limiting examples:

Chemicals, sources, and descriptions are listed in Table 1 below.

TABLE 1

| Trade Name | Source | Description |
|---|---|---|
| SAYTEX BT-93 | Albermarle Co. | Ethylenebis(tetrabromophthalimide), 67% by weight bromine |
| SAYTEX 102E | Albermarle Co. | Decabromo-diphenyl oxide, 83.3% by weight bromine |
| SAYTEX 120 | Albermarle Co. | Tetradecabromo-diphenoxy-benzene, 81.8% by weight bromine |
| SAYTEX RB-79 | Albermarle Co. | 3,4,5,6-Tetrabromo-1,2-benzene dicarboxylic acid; mixed esters with diethylene glycol and propylene glycol |
| PHT4-DIOL | Great Lakes Chemical Co. | Tetrabromophthalate diol, 46% by weight bromine |
| CATALYST | | 0.25 wt % Ferric acetyl acetonate and 0.75 wt % acetyl acetone in polyol |
| 3A SIEVE | UOP | Alkali metal aluminosilicate, $K_{12}[(AlO_2)_{12}(SiO_2)_{12}]$ $XH_2O$ |
| Antimony trioxide | US Antimony Corporation | $Sb_2O_3$, The particle size is 0.4 to 0.8 microns. 83.53 wt % antimony |
| L-5617 | Cromptom/OSi | Silicone-based surfactant |
| PPG-425 | Bayer | Polypropylene glycol, MW = 425 g/mol, viscosity at 25° C. = 70 cP |
| PPG-1000 | Bayer | Polypropylene glycol, MW = 1000 g/mol, viscosity at 25° C. = 164 cP |
| PPG-2000 | Bayer | Polypropylene glycol, MW = 2000, viscosity at 25° C. = 347 cP |
| Niax 34–45 | Bayer | polymer polyol—a polyether triol modified by styrene and acrylonitrile, viscosity at 25° C. = 1260 cP |
| IRGANOX 1135 | Ciba | Hindered phenol (antioxidant) |
| IRGANOX 5057 | Ciba | Aromatic amine (antioxidant) |
| PAPI 901 | Dow Chemical | Polymeric diphenyl methane diisocyanate, % NCO = 31.6, Average Functionality = 2.2 |
| PIGMENT | PAN Chemical | Colorant in polyol |
| Cloisite 30A | Southern Clay | Natural montmorillonite treated with organic modifier |
| DPG | Lyondell Chemical Company | Dipropylene glycol |

Polyurethane foams having the compositions set forth in Table 2 and Table 3 below were formulated as follows. The non-isocyanate components (i.e., the polyol mix, which contains the active hydrogen component, catalyst, flame retarding composition, and any fillers or additives) were mixed and placed in a holding tank with agitation and under dry nitrogen. This mixture was then pumped at a controlled flow rate to a high shear Oakes-type mixing head. The isocyanate was separately pumped into the mixing head. Dry air was introduced into the mixing head using a Matheson gas flow rate controller to adjust the flow so that the cured material had the desired density. After mixing and foaming, the composition was cast onto coated release paper that had been dried by passing it through a high air flow oven at 275–300° F. just prior to the point where the foam was introduced. The cast foam was then passed under a knife over plate (KOP) coater to spread the foam to the desired thickness. The cast foam was then passed through heated platens (400° F. upper, 250–375° F. lower) to cure, and subsequently cooled. The foams were then overcoated with a UV-curable acrylic composition. The foams thus synthesized were tested as follows. Results are shown in Table 2 and Table 3.

Modulus as reflected by compression force deflection (CFD) was determined on an Instron using 2-inch by 2-inch die-cut samples stacked to a minimum of 0.250 inches, usually about 0.375 inches, using two stacks per lot or run, and a 20,000 pound cell mounted in the bottom of the Instron. CFD was measured by calculating the force in pounds per square inch (psi) required to compress the sample to 25% of the original thickness.

Tensile strength and elongation were measured using an Instron fitted with a 50-pound load cell and using 10–20 pound range depending on thickness and density. Tensile strength is calculated as the amount of force (psi) at the break divided by the sample thickness and multiplied by two. Elongation is reported as percent extension.

Tear strength was measured using an Instron fitted with a 50-pound load cell and using a 2, 5, or 10-pound load range depending on sample thickness and density. Tear strength is calculated by dividing the force applied at tear by the thickness of the sample.

Outgassing was measured by ASTM E595 or by determining the percent weight loss of a sample held at 125° C. for 24 hours. Outgassing for these and similar formulations is generally less than 1 weight percent.

Fogging was measured in accordance with SAE J1756. These and similar formulations pass this standard.

Compression set was determined by measuring the amount in percent by which a standard test piece of the foam fails to return to its original thickness after being subjected to a 50% or 25% compression for 22 hours at 70° C.

TABLE 2

| | Sample Number | | | | | |
|---|---|---|---|---|---|---|
| | 1 | 2 | 3a | 4a | 4b | 3b |
| Thickness, mil | 125 | 125 | 31 | 31 | 62 | 31 |
| Density, pcf | 20 | 25 | 40 | 40 | 40 | 60 |
| SAYTEX BT93 | 13.63 | 16.77 | 12.96 | 14.00 | | |
| PHT4-DIOL | 13.63 | 12.58 | 12.96 | 14.00 | | |
| ANTIMONY TRIOXIDE | 3.79 | 5.59 | 3.60 | 7.54 | | |
| PPG-425 | 0.00 | 0.00 | 27.30 | 23.74 | | |
| PPG-1000 | 28.72 | 23.44 | 0.00 | 0.00 | | |
| PPG-2000 | 7.57 | 6.08 | 7.20 | 5.37 | | |
| DPG | 0.00 | 1.12 | 0.00 | 0.00 | | |
| CATALYST | 3.03 | 4.19 | 2.88 | 2.70 | | |
| L-5617 | 3.79 | 3.49 | 3.60 | 1.88 | | |
| 3A SIEVE | 1.51 | 1.40 | 1.44 | 1.38 | | |
| IRGANOX 1135 | 0.09 | 0.08 | 0.09 | 0.08 | | |
| IRGANOX 5057 | 0.02 | 0.02 | 0.02 | 0.02 | | |
| PIGMENT | 5.17 | 4.77 | 4.92 | 4.29 | | |
| NIAX 34–45 | 2.21 | 2.04 | 0.00 | 1.83 | | |
| CLOISITE 30A | 0.00 | 1.40 | 0.00 | 0.00 | | |
| PAPI 901 | 16.84 | 17.03 | 23.03 | 23.17 | | |
| TOTAL | 100.00 | 100.00 | 100.00 | 100.00 | | |
| PROPERTIES | | | | | | |
| CFD, psi | 5.3 | 12.2 | 31.3 | 108.3 | 146.3 | |
| Tensile strength, psi | 65.4 | 103.0 | 301.1 | 339.0 | 407.0 | |
| Elongation, % | 179 | 149 | 228 | 125 | 129 | |
| Tear, pli | 10.2 | 17.4 | 55.1 | 56.6 | 78.2 | |
| C-set, % | 3.0* | 4.9* | 6.5** | 8.0** | 5.7** | |
| Br, moles | 0.2014 | 0.2212 | 0.1915 | 0.2069 | | |
| Sb, moles | 0.0260 | 0.0384 | 0.0247 | 0.0517 | | |
| Br/Sb, molar ratio | 7.75 | 5.77 | 7.75 | 4.0 | | |
| Br, wt %*** | 15.40 | 17.02 | 14.64 | 15.82 | | |
| Sb, wt %*** | 3.17 | 4.67 | 3.01 | 6.30 | | |
| Br/Sb, weight ratio | 4.87 | 3.65 | 4.87 | 2.51 | | |
| UL94 Vertical burning test | failed | V-1 | failed | failed | V-0 | |
| UL94 side Horizontal burning test | — | — | HBF | HF-1 | HBF | HBF |
| Polyol mix viscosity, cP (approx.) | 2800 | 5500 | 1800 | 2300 | — | — |

*measured at 50% compression
**measured at 25% compression
***calculated as weight percent of total composition

TABLE 3

| | Sample No. | | | | | | |
|---|---|---|---|---|---|---|---|
| | 5 | 6 | 7 | 8 | 9 | 10 | 11 |
| Thickness, mil | 125 | 62 | 62 | 62 | 62 | 31 | 31 |
| Density, pcf | 25 | 25 | 25 | 25 | 25 | 30 | 30 |
| Saytex 102E | 0.00 | 0.00 | 24.42 | 27.78 | 29.60 | 26.43 | 29.12 |
| Saytex 120 | 0.00 | 27.78 | 0.00 | 0.00 | 0.00 | 0.00 | 0.00 |
| Saytex BT93 | 24.37 | 0.00 | 0.00 | 0.00 | 0.00 | 0.00 | 0.00 |
| PHT4-DIOL | 12.90 | 12.63 | 12.63 | 12.63 | 12.68 | 12.01 | 13.24 |
| Antimony VF | 7.61 | 4.21 | 7.58 | 4.21 | 4.23 | 4.00 | 4.41 |
| PPG-425 | 0.00 | 0.00 | 0.00 | 0.00 | 0.00 | 20.02 | 15.80 |
| PPG-1000 | 17.92 | 17.68 | 17.68 | 17.68 | 16.07 | 0.00 | 0.00 |
| PPG-2000 | 6.24 | 6.74 | 6.74 | 6.74 | 6.77 | 3.20 | 3.21 |
| DPG | 0.97 | 0.97 | 0.97 | 0.97 | 0.97 | 0.92 | 0.92 |
| CATMIXLOAA | 3.62 | 3.63 | 3.63 | 3.63 | 3.64 | 3.44 | 3.45 |
| L-5617 | 3.23 | 3.34 | 3.34 | 3.34 | 3.36 | 3.18 | 3.18 |
| 3A SIEVE | 1.20 | 1.20 | 1.20 | 1.20 | 1.20 | 1.15 | 1.15 |
| IRGANOX 1135 | 0.09 | 0.10 | 0.10 | 0.10 | 0.10 | 0.10 | 0.10 |
| IRGANOX 5057 | 0.02 | 0.03 | 0.03 | 0.03 | 0.03 | 0.02 | 0.02 |
| JET BLACK | 4.12 | 4.13 | 4.13 | 4.13 | 4.14 | 3.92 | 3.93 |
| NIAX 34–45 | 1.76 | 1.77 | 1.75 | 1.76 | 1.78 | 1.70 | 1.69 |
| PAPI 901 | 15.94 | 15.80 | 15.80 | 15.80 | 15.43 | 19.91 | 19.78 |
| Total | 100.00 | 100.00 | 100.00 | 100.00 | 100.00 | 100.00 | 100.00 |
| PROPERTIES | | | | | | | |
| CFD, psi | 20.2 | 15.6 | 9.8 | 12.9 | 12.8 | 33.6 | 153.0 |
| Tensile strength, psi | 150.1 | 145.9 | 128.1 | 144.8 | 135.4 | 230.3 | 369.6 |
| Elongation, % | 137 | 140 | 143 | 155 | 133 | 135 | 80 |
| Tear, pli | 22.3 | 17.4 | 16.6 | 18.6 | 17 | 36.2 | 51.2 |
| C-set, % | 3.6 | 3.9 | 4.2 | 3.2 | 3.3 | 5.3 | 7.0 |
| Br, moles | 0.2792 | 0.3572 | 0.3273 | 0.3623 | 0.3816 | 0.3447 | 0.3798 |
| Sb, moles | 0.0522 | 0.0289 | 0.0520 | 0.0289 | 0.0290 | 0.0274 | 0.0303 |
| Br/Sb, molar ratio | 5.35 | 12.37 | 6.29 | 12.54 | 13.15 | 12.56 | 12.55 |
| Br, wt %*** | 22.31 | 28.53 | 26.15 | 28.95 | 30.49 | 27.54 | 30.35 |
| Sb, wt %*** | 6.36 | 3.52 | 6.33 | 3.52 | 3.53 | 3.34 | 3.68 |
| Br/Sb, weight ratio | 3.51 | 8.11 | 4.13 | 8.23 | 8.63 | 8.24 | 8.24 |
| UL94 Vertical burning test | V-0 | V-0 | V-0 | V-0 | V-0 | V-0 | V-0 |
| Polyol mix viscosity, cP (approximate) | 6960 | 4000 | 4600 | 5350 | 4600 | 5000 | 6590 |

*measured at 50% compression
**measured at 25% compression
***calculated as a weight percent of total composition.

Samples 1, 2, 5, 6, 7, 8 and 9 are low modulus, and samples 3a, 4a, 4b, 10 and 11 are high modulus. As the above data show, the polyurethane foams of this invention meet UL 94 burn test requirements (V0, V1, HF1, HBF). This flame retardancy is achieved by incorporating a liquid brominated reactive diol, a brominated solid organic filler, and antimony trioxide. As synergistic effect between bromine and antimony content may be achieved at a molar ratio of about 2.0:1 to about 24.0:1. The low viscosity of the polyol batch accommodates the viscosity increase due to the additives.

The above-described flame retardant composition is of further utility in the manufacture of solid polyurethanes, e.g., polyurethane elastomers. Suitable compositions and methods for preparing elastomeric polyurethane polymers are described, for example, in U.S. Pat. Nos. 4,297,444; 4,218,543; 4,444,910; 4,530,941 and 4,269,945. Such elastomers are typically prepared by intimately mixing the reaction components at room temperature or a slightly elevated temperature for a short period and then casting the mixture or pouring the resulting mixture into an open mold, or injecting the resulting mixture into a closed mold, which in either case is heated. Upon completion of the reaction, the mixture takes the shape of the mold to produce a polyurethane elastomer of a predefined structure, which can then be sufficiently cured and removed from the mold with a minimum risk of incurring deformation greater than that permitted for its intended end application. Suitable conditions for promoting the curing of the elastomer include a mold temperature of typically from about 20 to about 150° C., preferably from about 35 to about 75° C., and more preferably from about 45 to about 55° C. Such temperatures generally permit the sufficiently cured elastomer to be removed from the mold typically in about 1 to 10 minutes and more typically in about 1 to 5 minutes after intimately mixing the reactants. Optimum cure conditions will depend on the particular components including catalysts and quantities used in preparing the elastomer and also the size and shape of the article.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A flame retardant polyurethane foam formed from a composition comprising:

an organic polyisocyanate component;

an active hydrogen-containing component substantially reactive with the polyisocyanate to form a polyurethane, wherein the viscosity of the active hydrogen-containing component is less than about 500 cP at room temperature;

a surfactant;

a catalyst having substantial catalytic activity in the curing of said mixture; and a flame retarding composition comprising:

an antimony-based compound;

a halogenated, active hydrogen-containing component reactive with the polyisocyanate component; and a halogenated flame retarding agent, wherein the molar ratio of total halogen to antimony is about 2.0:1 to about 24.0:1, and further wherein the total composition comprises at least about 12 weight percent halogen.

2. The foam of claim 1, wherein the wherein the molar ratio of total halogen to antimony is about 3.0:1 to about 18.0:1.

3. The foam of claim 1, wherein the wherein the molar ratio of total halogen to antimony is about 4.0:1 to about 16.0:1.

4. The foam of claim 1, wherein the viscosity of the active hydrogen-containing component is less than about 300 cP at room temperature.

5. The foam of claim 1, wherein the viscosity at room temperature of a mixture of the active hydrogen-containing component, surfactant, flame retarding composition, and catalyst is less than about 8000 cP at room temperature.

6. The foam of claim 1, wherein the antimony-based compound is antimony trioxide.

7. The foam of claim 1, wherein the halogenated, active hydrogen-containing component is a brominated polyol.

8. The foam of claim 1, wherein the composition is low VOC.

9. The foam of claim 1, wherein the molar ratio of total halogen to antimony is about 10:1 to about 24.0:1.

10. The foam of claim 1 having a UL 94 rating of V-0, V-1, HF1 or HBF.

11. The foam of claim 9, wherein the foam has a thickness of less than about one-half inch and a density of about 10 to about 65 pcf.

12. The foam of claim 1 having a UL 94 rating of V-0 and HFB, wherein the foam has thickness of about 12 to about 500 mils and a density of about 10 to about 30 pcf.

13. The foam of claim 1 having a 70° C. compression set of less than about 10% after 50% compression for 22 hours, a compressive force deflection of less than about 30 psi, and a tear strength greater than about 5 pli.

14. The foam of claim 1 having a 70° C. compression set of less than about 10% after 25% compression for 22 hours, a compressive force deflection of greater than about 50 psi, and a tear strength greater than about 5 pli.

15. An article of manufacture comprising the foam of claim 1.

16. A gasket comprising the foam of claim 1.

17. A gasket comprising the foam of claim 10.

* * * * *